(12) United States Patent
Tanaka et al.

(10) Patent No.: US 11,906,326 B2
(45) Date of Patent: Feb. 20, 2024

(54) MAP UPDATE METHOD, MAP UPDATE SERVER, AND ONBOARD TERMINAL

(71) Applicant: DENSO CORPORATION, Kariya (JP)

(72) Inventors: Tsuyoshi Tanaka, Kariya (JP); Tomoo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 348 days.

(21) Appl. No.: 17/200,029

(22) Filed: Mar. 12, 2021

(65) Prior Publication Data

US 2021/0199464 A1 Jul. 1, 2021

Related U.S. Application Data

(63) Continuation of application No. PCT/JP2019/034773, filed on Sep. 4, 2019.

(30) Foreign Application Priority Data

Sep. 14, 2018 (JP) .................................. 2018-172499

(51) Int. Cl.
G01C 21/00 (2006.01)
G08G 1/0968 (2006.01)
G08G 1/0969 (2006.01)

(52) U.S. Cl.
CPC ....... *G01C 21/3896* (2020.08); *G08G 1/0969* (2013.01); *G08G 1/096827* (2013.01); *G08G 1/096844* (2013.01)

(58) Field of Classification Search
CPC ............ G01C 21/3896; G01C 21/3859; G08G 1/096827; G08G 1/096844; G08G 1/0969; G08G 1/0112; G08G 1/0129; G08G 1/0141; G08G 1/096716; G08G 1/096741; G08G 1/096775; G09B 29/004
See application file for complete search history.

(56) References Cited

U.S. PATENT DOCUMENTS

| | | | | |
|---|---|---|---|---|
| 10,584,971 B1 * | 3/2020 | Askeland | ........... | G01C 21/3859 |
| 11,009,357 B2 * | 5/2021 | Aoyama | ................ | G06F 16/29 |
| 11,204,256 B2 * | 12/2021 | Aoyama | .......... | G08G 1/096822 |
| 2007/0156759 A1 * | 7/2007 | Sekine | ............... | G01C 21/3859 |

(Continued)

FOREIGN PATENT DOCUMENTS

JP 6302848 B 3/2018

*Primary Examiner* — Sze-Hon Kong
(74) *Attorney, Agent, or Firm* — MASCHOFF BRENNAN

(57) ABSTRACT

In response to confirmation request from an onboard terminal in a state where updated data after start of a temporary road change is available, a map update server distributes the updated data and instructs the onboard terminal to temporarily use the updated data. In response to the confirmation request in a state where the updated data after end of a temporary road change is available, the server instructs the onboard terminal to use the updated data from before the start of the temporary road change. In response to being instructed to temporarily use the updated data, the terminal uses the updated data that has been distributed. In response to being instructed to use the updated data from before the start of a temporary road change, the terminal temporarily uses the updated data by using map data from before the start of the temporary road change instead of the updated data.

9 Claims, 8 Drawing Sheets

(56) References Cited

U.S. PATENT DOCUMENTS

| | | | |
|---|---|---|---|
| 2007/0282524 A1* | 12/2007 | Tanizaki | G09B 29/10 340/995.12 |
| 2009/0177378 A1* | 7/2009 | Kamalski | G01C 21/26 382/181 |
| 2011/0179080 A1* | 7/2011 | Miyazaki | G06F 16/29 707/769 |
| 2014/0278070 A1* | 9/2014 | McGavran | G01C 21/362 701/538 |
| 2015/0112537 A1* | 4/2015 | Kawamata | G05D 1/0274 701/23 |
| 2015/0345968 A1 | 12/2015 | Wang | |
| 2018/0003512 A1* | 1/2018 | Lynch | G01C 21/3811 |
| 2019/0026796 A1* | 1/2019 | Dinis da Silva de Carvalho | G06Q 50/30 |
| 2019/0187723 A1* | 6/2019 | Tao | G01C 21/3415 |
| 2019/0301891 A1* | 10/2019 | Rowitch | G01C 21/3694 |
| 2021/0406559 A1* | 12/2021 | Efland | G06V 10/803 |
| 2023/0145649 A1* | 5/2023 | Miksa | G01C 21/3841 701/24 |

* cited by examiner

MAP UPDATE METHOD, MAP UPDATE SERVER, AND ONBOARD TERMINAL

CROSS-REFERENCE TO RELATED APPLICATION

The present application is a continuation application of International Application No. PCT/JP2019/034773, filed Sep. 4, 2019, which claims priority to Japanese Patent Application 2018-172499, filed Sep. 14, 2018. The contents of these applications are incorporated herein by reference in their entirety.

BACKGROUND

Technical Field

The present disclosure relates to a map update method, a map update server, and an onboard terminal.

Related Art

Conventionally, there is a method in which comparison/statistical processing is performed on road data and a trajectory of a vehicle that passes on a road, and a map update server detects a change in the road and updates map data in an onboard terminal.

SUMMARY

One aspect of the present disclosure provides a map update method in which in response to a confirmation request being received from an onboard terminal in a state in which updated data after start of a temporary road change is available, a map update server distributes the updated data and instructs the onboard terminal to temporarily use the updated data. In response to the confirmation request being received from the onboard terminal in a state in which the updated data after end of a temporary road change is available, the map update server instructs the onboard terminal to use the updated data from before the start of the temporary road change. In response to being instructed to temporarily use the updated data, the onboard terminal uses the updated data that has already been distributed. In response to being instructed to use the updated data from before the start of a temporary road change, the onboard terminal temporarily uses the updated data by using map data from before the start of the temporary road change instead of the updated data.

DESCRIPTION OF THE EMBODIMENTS

Figure 1:
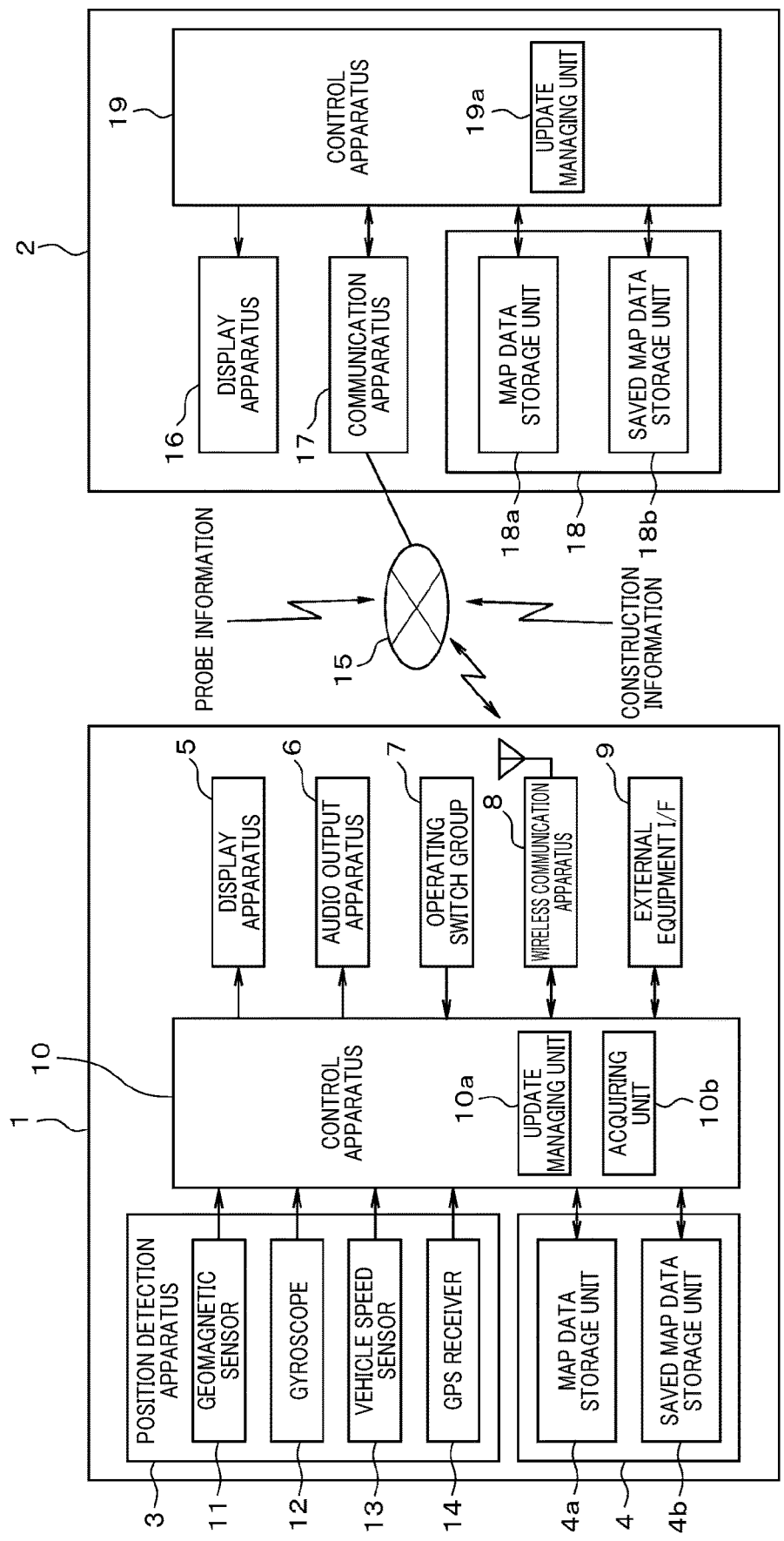
FIG. 1 is a functional block diagram of a map update system according to an embodiment.

Conventionally, there is a method in which comparison/statistical processing is performed on road data and a trajectory of a vehicle that passes on a road, and a map update server detects a change in the road and updates map data in an onboard terminal (see Japanese Patent Publication No. 6302848).

In a technology in Japanese Patent Publication No. 6302848, a map update server performs update/distribution of map data each time a change in a road state (referred to, hereafter, as a road change) is detected. Therefore, the map data can be expected to be promptly updated.

However, for example, in a state in which a temporary road change occurs in which a road is restored to an original road after a road change, such as road restoration work, the road change occurs twice (after start of work and after end of work). Therefore, the update/distribution of map data is performed twice before the end of the temporary road change. Consequently, when the onboard terminal temporarily uses the map data that is updated for the temporary road change, the map data that is same as the original road is unnecessarily distributed after the end of work. Therefore, an amount of data communication increases by this amount.

It is thus desired to provide a map update method, a map update server, and an onboard terminal that are capable of reducing an amount of data communication between the onboard terminal and the map update server in a state in which a temporary road change occurs.

One exemplary embodiment of the present disclosure provides a map update method in which, in response to a confirmation request being received from an onboard terminal in a state in which updated data after start of a temporary road change is available, a server-side update managing unit of a map update server distributes the updated data and transmits a confirmation result to instruct the onboard terminal to temporarily use the updated data.

In response to the confirmation result from the map update server to instruct the onboard terminal to temporarily use the updated data, an onboard-terminal-side update managing unit of the onboard terminal uses the distributed updated data.

In response to the confirmation request being received from the onboard terminal in a state in which the updated data after end of a temporary road change is available, the server-side update managing unit of the map update server transmits a confirmation result to instruct the onboard terminal to use the updated data from before the start of the temporary road change.

In response to the confirmation result from the map update server to instruct the onboard terminal to use the updated data from before the start of the temporary road change, the onboard-terminal-side update managing unit of the onboard terminal temporarily uses the updated data by using map data from before the start of temporary road change instead of the updated data.

As a result of operations such as those above, when the onboard terminal temporarily uses the updated data, data communication between the onboard terminal and the map update server can be suppressed. Therefore, an amount of data communication can be reduced.

An embodiment will hereinafter be described with reference to the drawings.

As shown in FIG. 1, a map update system is configured by an automotive navigation system (referred to, hereafter, as a car navigation device; corresponding to an onboard terminal) 1 that is mounted in a vehicle, and a map update server (referred to, hereafter, as a server; corresponding to a server) 2 that is set in an information center. The car navigation device 1 is configured to include a position detection apparatus 3, a storage apparatus 4, a display apparatus 5, an audio output apparatus 6, an operating switch group 7, a wireless communication apparatus 8, an external equipment interface (I/F) 9, and a control apparatus 10.

The position detection apparatus 3 is configured by a geomagnetic sensor 11, a gyroscope 12, a vehicle speed sensor 13, and a global positioning system (GPS) receiver 14. The position detection apparatus 3 successively detects a current position of the vehicle based on detection signals from the plurality of components 11 to 14. The position detection apparatus 3 is not required to be configured by all of the plurality of components 11 to 14, and may be configured by a portion of the components. For example, the storage apparatus 4 is a read-write storage apparatus such as a hard disk drive. The storage apparatus 4 has a map data storage unit 4a and a saved map data storage unit 4b. For example, the storage apparatus 4 may be configured to be capable of being detached, such in a manner similar to a Secure Digital (SD) memory card.

For example, the display apparatus 5 may be capable of full-color display, and can be configured using a liquid crystal display, an organic electroluminescent (EL) display, a plasma display, or the like. The audio output apparatus 6 is configured by a speaker or the like, and outputs voice guidance and the like based on a command from the control apparatus 10. For example, the operating switch group 7 may be configured by a touch panel that is integrated with the display apparatus 5 or mechanical switches. The operating switch group 7 outputs, to the control apparatus 10, a switch signal that is based on a switch operation by the user.

The wireless communication apparatus 8 provides a function for performing communication with the server 2 over a public network 15 such as a mobile phone network or the Internet. For example, the wireless communication apparatus 8 may be configured by an onboard communication module that is used in telematics communication, such as a data communication module (DCM) that is mounted in a vehicle, or configured by a dedicated short range communications (DSRC) communication module. In addition, the wireless communication apparatus 8 may be configured by a Bluetooth (registered trademark) communication module, and may be configured to perform communication with the server 2 through a mobile terminal (such as a mobile phone or a smart phone) that is connected by Bluetooth communication.

For example, the external equipment I/F 9 may be configured by an I/F for connecting to an external computer or the like, using Universal Serial Bus (USB) or the like. A configuration may be such that communication with the server 2 is performed by wireless communication through the external equipment I/F 9 and the external computer.

The control apparatus 10 is mainly configured by a microcomputer that is composed of a central processing unit (CPU), a read-only memory (ROM), a random access memory (RAM), a backup RAM, and the like. The control apparatus 10 provides functions of an update managing unit 10a (corresponding to an onboard terminal-side update managing unit) and an acquiring unit 10. The control apparatus 10 performs a map display process, a route retrieval process, and a route guidance process, and the like as a navigation function, based on various types of information inputted from the position detection apparatus 3, the storage apparatus 4, the operating switch group 7, the wireless communication apparatus 8, and the external equipment I/F 9.

When map data that is stored in the map data storage unit 4a of the storage apparatus 4 is updated to updated data that is newest map data, the control apparatus 10 transmits and receives information for updating the map data by communicating with the server 2 through the wireless communication apparatus 8, the external equipment I/F 9, or the like. That is, the control apparatus 10 downloads the updated data by issuing an update request to the server 2, and updates the applicable map data that is stored in the map data storage unit 4a of the storage apparatus 4.

The server 2 is configured by a display apparatus 16, a communication apparatus 17, a storage apparatus 18, and a control apparatus 19, and is connected to the public network 15 through the communication apparatus 17. The storage apparatus 18 is configured to have a map data storage unit 18a and a saved map data storage unit 18b.

The control apparatus 19 is mainly configured by a microcomputer that is composed of a CPU, a ROM, a RAM, a backup RAM, and the like. The control apparatus 19 provides a function as an update managing unit 19a (corresponding to a server-side update managing unit). The control apparatus 19 collects probe information that is composed of image data and position data captured by multiple probe vehicles, through the public network 15. When the map data is determined to have changed based on the collected probe information, the control apparatus 19 generates the updated data that is the newest map data.

When a confirmation request regarding the updated data is issued from the car navigation device 1, the server 2 responds with the applicable updated data as a confirmation result. Response herein refers to distribution of the updated data or a command for data processing in an onboard component. Therefore, for example, even when a road change occurs, because the car navigation device 1 is able to acquire the updated data that corresponds to the road change from the server 2 and perform a route retrieval process, the car navigation device 1 can provide various types of navigation functions corresponding to the road change to the user.

The road change refers to a case in which the server 2 determines that a road change that affects traveling of the vehicle has occurred based on the probe information that is collected from the multiple probe vehicles. A detour route is mainly assumed as a case in which the road change occurs. However, the road change refers to all changes that affect a traveling route of the vehicle, such as changes in regulation information such as road closure, and changes in traveling lanes. The newest map data is not limited to probe information and may be acquired from a map data provider.

Here, for example, in a case in which the vehicle passes through a section in which a temporary road change occurs, navigation (such as traveling/guidance/route retrieval) that avoids effects of the road change can be performed based on the updated data.

However, in a case in which, after a temporary road change, a road environment is restored to the road environment before the road change, because the updated data that is the same as the original map data is received from the server 2 and used, an amount of data communication between the car navigation device 1 and the server 2 becomes unnecessary.

Based on such circumstances, according to the present embodiment, the amount of data communication between the car navigation device 1 and the server 2 during temporary road change is reduced in a following manner.

First, basic operations between the car navigation device 1 and the server 2 will be described.

Figure 2:
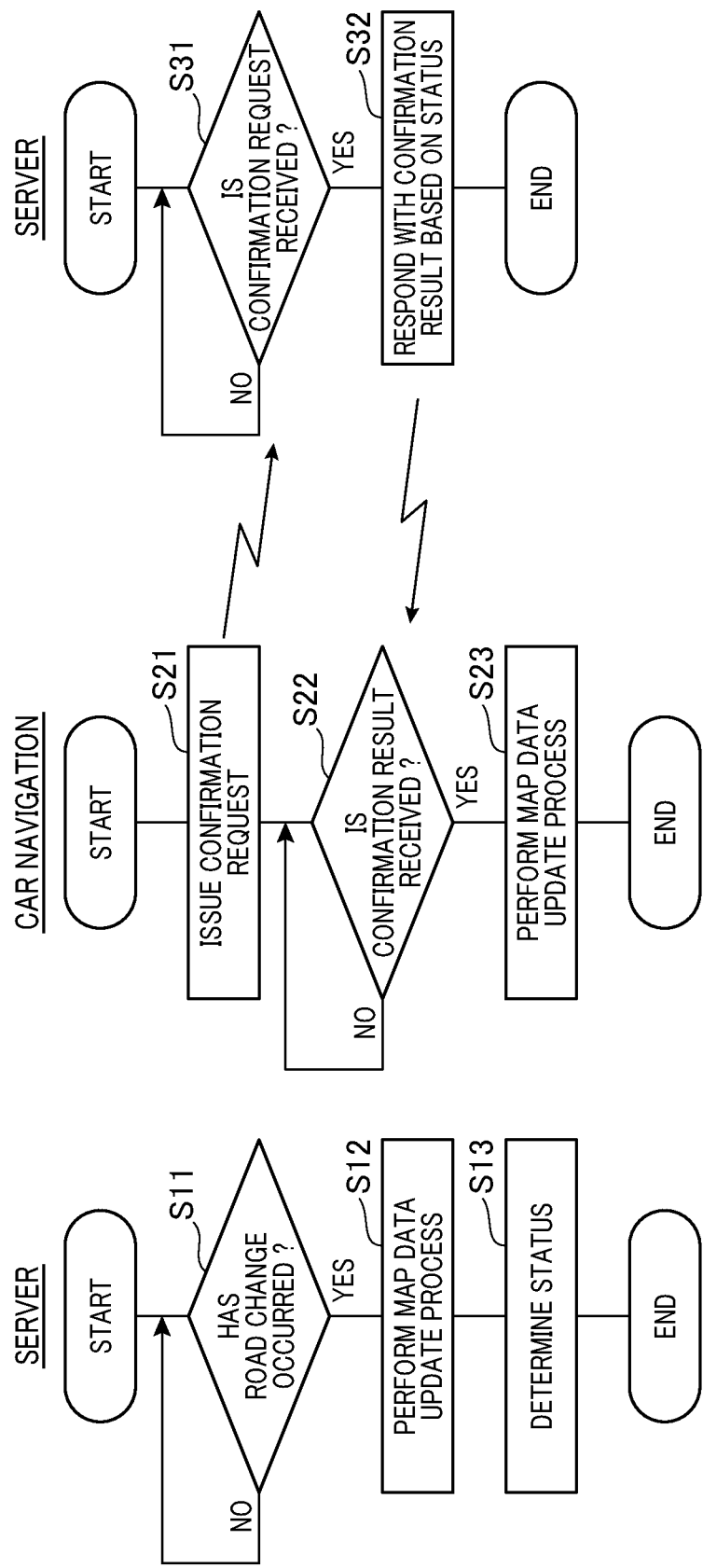
FIG. 2 is a flowchart schematically showing communication operations between a car navigation device and a server.

As shown in FIG. 2, when a road change occurs (YES at S11), the server 2 determines a status (S12).

The car navigation device 1 issues a confirmation request regarding the updated data to the server 2, as the vehicle advances. When the confirmation request from the car navigation device 1 is received (YES at S31), the server 2 responds to the car navigation device 1 with the confirmation result based on the current status (S32). When the confirmation result from the server 2 is received (YES at S22), the car navigation device 1 performs a map data update process based on the confirmation result (S23).

In a manner such as that above, the user can be provided with the navigation function that corresponds to the road change.

Hereafter, to describe the operations shown in FIG. 2 in detail, a case in which the vehicle temporarily travels on a detour route as road restoration work will be described as an example.

Figure 3:
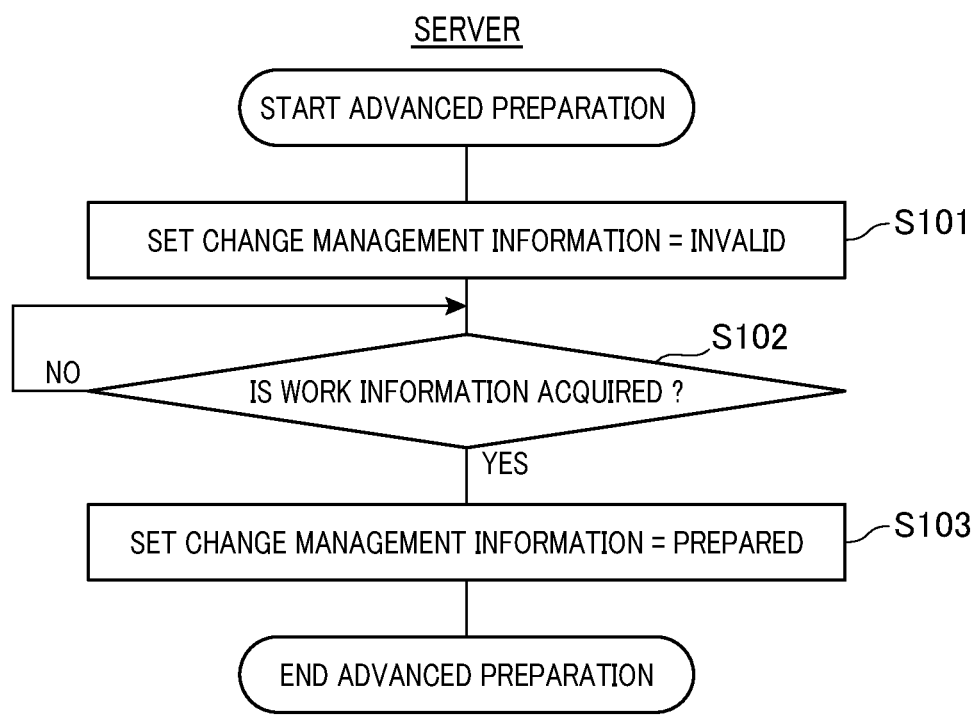
FIG. 3 is a flowchart of an advanced preparation operation by the server.
Figure 5:
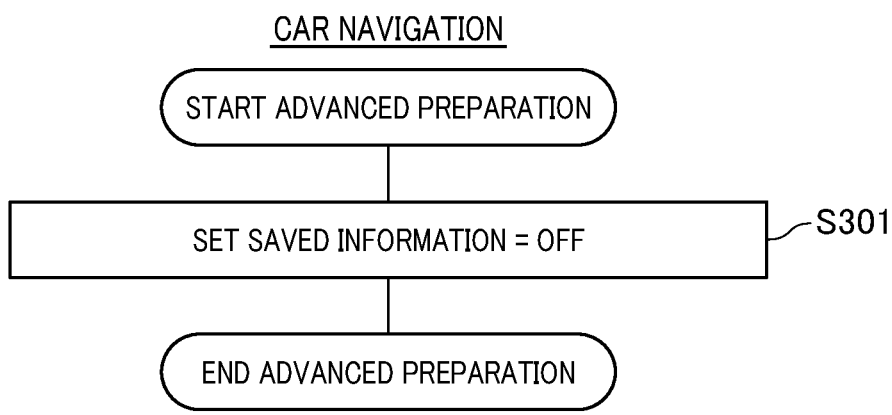
FIG. 5 is a flowchart of an advanced preparation operation by the car navigation device.

As shown in FIG. 3, as advanced preparation, the server 2 sets change management information="invalid" (S101). Meanwhile, as shown in FIG. 5, as advanced preparation, the car navigation device 1 sets saved information=OFF (S301).

1. Operations for the Car Navigation Device 1 when a Typical Change in Road State is Required to be Reflected (1) When the Change Management Information="Invalid"

Figure 4:
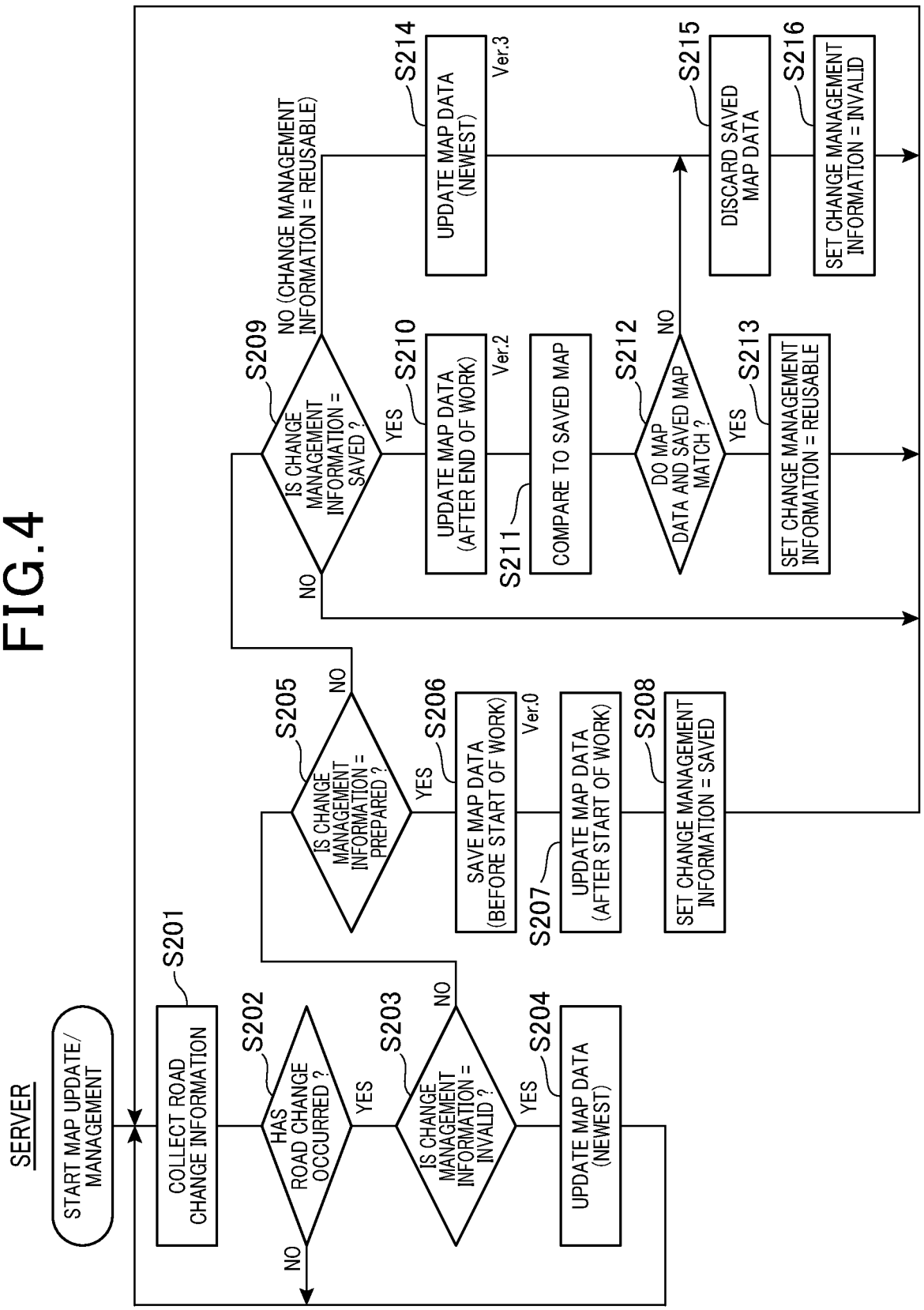
FIG. 4 is a flowchart of a map update/management operation by the server.

As shown in FIG. 4, the server 2 collects information (referred to, hereafter, as road change information) on a location and a period of road work, and the like (S201), and determines whether a road change has occurred based on the probe information (S202). When determined that a road change has occurred (YES at S202), the server 2 determines the change management information (S203). Because the change management information="invalid" at this time (YES at S203), the server 2 updates the map data stored in the map data storage unit 18a of the storage unit 18 to the newest map data (S204).

In a manner such as that above, the updated data is generated each time a road change occurs.

Figure 6:
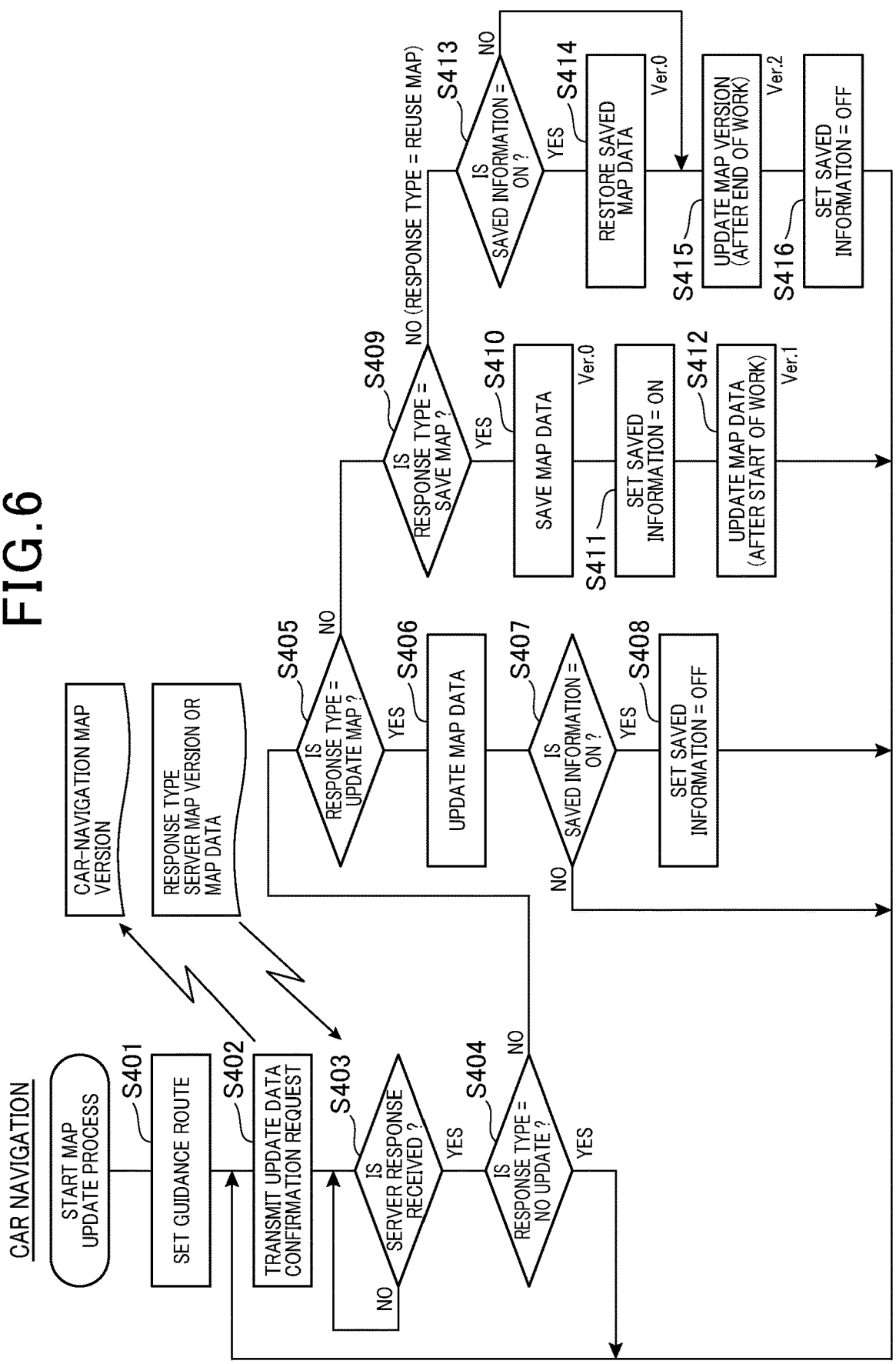
FIG. 6 is a flowchart of a map update processing operation by the car navigation device.

Here, when the user sets a destination, the car navigation device 1 sets a guidance route, such as in a manner shown in FIG. 6, and provides the guidance route to the user (S401). The user drives the vehicle based on the guidance route provided by the car navigation device 1. The car navigation device 1 transmits a confirmation request regarding the updated data as the vehicle advances (S402). At this time, a map version of the car navigation device 1 is additionally transmitted.

Figure 7:
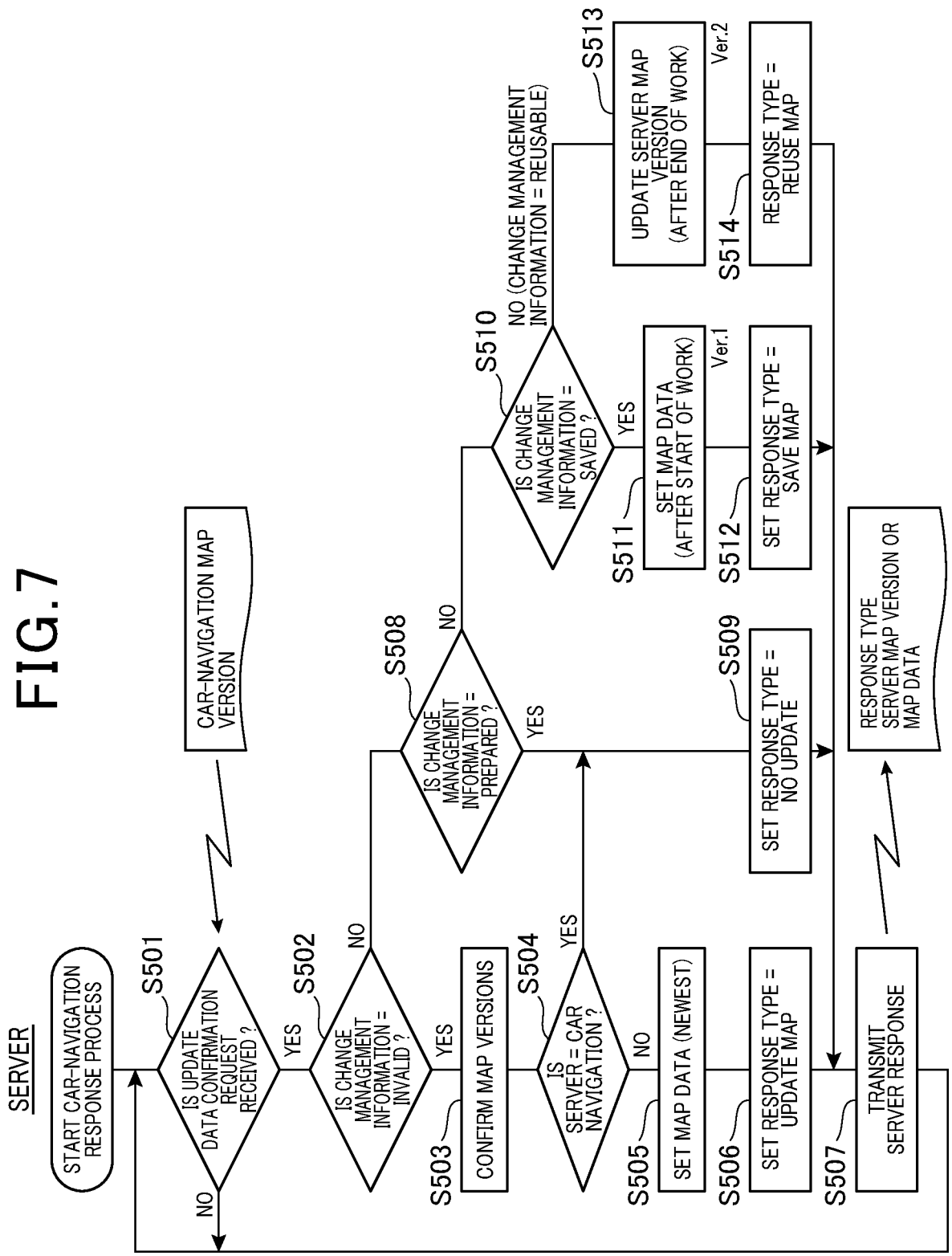
FIG. 7 is a flowchart of a car navigation device response processing operation by the server.

As shown in FIG. 7, when the confirmation request regarding the updated data is received from the car navigation device 1 (YES at S501), the server 2 determines the change management information (S502). Because the change management information="invalid" at this time (YES at S502), the server 2 confirms the own map version and the received map version of the car navigation device 1 (S503). When both map versions are the same (YES at S504), because the map data is not required to be updated, the server 2 sets response type="no update" (S509) and subsequently responds with the response type (S507).

When the response type="no update" is received (YES at S404), the car navigation device 1 has no operation to perform.

Meanwhile, when both versions of map data differ (NO at S504), the server 2 sets the newest map data (S505) and sets the response type="map updated" (S506). The server 2 then transmits the response type and the map data (S507).

When the response type="map updated" is received (YES at S405), the car navigation device 1 updates the map data to the received map data (S406), and determines whether the saved information=ON (S407). Because the saved information=OFF at this time (NO at S407), the car navigation device 1 has no operation to perform. Here, when the saved information=ON (YES at S407), the car navigation device 1 sets the saved information=OFF (S408). The saved information is information that indicates that the map data is saved.

2. Operations for the Car Navigation Device 1 when a Change in Road State is Required to be Reflected During a Work Period Here, in the advanced preparation shown in FIG. 3, when the change management information="invalid" as described above, the server 2 determines whether work information is acquired from an official bulletin, a homepage (HP) on the Internet, or the like (S102). When the work information is acquired (YES at S102), the server 2 sets the change management information="prepared" (S103).

In the manner described above, the advanced preparation is ended.

(2) When the Change Management Information="Prepared"

When the confirmation request regarding the updated data is received from the car navigation device 1 (YES at S501), because the change management information="prepared" (YES at S508), the server 2 sets the response type="no update" (S509) and subsequently transmits the response type (S507).

Because the response type="no update" is received (YES at S404), the car navigation device 1 has no operation to perform.

In the manner above, when the change management information="prepared," the map data in the car navigation device 1 is not updated.

When determined that a road change has occurred as a result of a probe vehicle traveling on a detour route (YES at S202), because the change management information="prepared" (YES at S205), the server 2 considers work to have started and saves the map data in the saved map data storage unit 18b of the storage apparatus 18 (S206). The saved map data is the map data from before the start of work and the map version is Ver. 0. This map version is provisionally referred to as Ver. 0 to simplify the description and in actuality is the actual map version at the time.

Next, after updating the map data (S208), the server 2 sets the change management information="saved" (S208).

In the manner above, while the map data from before the start of work in the server 2 is saved, the map data is updated to the map data after the start of work.

(3) When the Change Management Information="Saved"

When a work section is present on a retrieved route or the work section is approached during vehicle traveling, the car navigation device 1 transmits a confirmation request regarding the updated data including the work section. When the confirmation request regarding the updated data is received from the car navigation device 1 (YES at S501), because the change management information="saved" (YES at S510), the server 2 sets the map data (S511). This map data is the map data after the start of work and the map version is Ver. 1. Next, the server 2 sets the response type="save map" (S512), and subsequently transmits the response type and the map data (S507).

When the response from the server 2 is received (YES at S403), because the response type="save map" (YES at S409), the car navigation device 1 saves the map data (S410). The map data at this time is the map data from before the start of work and the map version is Ver. 0. Next, the car navigation device 1 sets the saved information=ON (S411) and updates the map data to the updated data (S412). The updated data is the map data after the start of work and the map version is Ver. 1.

When determined that a road change has occurred as a result of a probe vehicle traveling on a road before roadwork instead of a detour route (YES at S202), because the change management information="saved" (YES at S209), the server 2 considers work to have ended and updates the map data (S210). The map data at this time is the map data after the end of work and the map version is Ver. 2.

Next, the server 2 compares the map data with the saved map (S211) and determines whether the map data and the saved map match (S212). As a range over which the matching of map data is determined, a single road link unit, an area unit, or the like can be considered. When the road changes after the end of work, there is a case in which the road in the work section is restored to the road before the start of work and a case in which the road is not restored. When the road is restored to the road before the start of work, because the updated data matches the saved map data (YES at S212), the server 2 sets the change management information="reusable" (S213).

Meanwhile, when the road differs from that before the start of work, because the updated data does not match the saved map (NO at S212), the server 2 discards the saved map data (S215) and subsequently sets the change management information="invalid" (S216).

(4) When the Change Management Information="Reusable"

When the confirmation request regarding the updated data is received from the car navigation device 1 (YES at S501), because the change management information="reusable" (NO at S510), the server 2 sets the map version (S513) and sets the response type="reuse map" (S514). The server 2 then transmits the response type and the map version (S507). The map version at this time is Ver. 2.

In the manner above, when the change management information="reusable," only the map version is transmitted and the map data is not transmitted. A reason for this is because the car navigation device 1 continues to use the saved map data in the following manner.

When the response is received from the server 2 (YES at S403), because the response type="reuse map" (NO at S409), the car navigation device 1 confirms whether the saved information=ON (S413). Because the saved information=ON (YES at S413), the car navigation device 1 restores the saved map data (S414). The version of the saved map data at this time is Ver. 0.

Next, after updating to the received map version (S415), the car navigation device 1 sets the saved information=OFF (S416). The map version at this time is the map version after the end of work and is Ver. 2.

In the manner above, the car navigation device 1 is capable of performing navigation based the restored saved map data.

When a road change has occurred (YES at S202), when the change management information="reusable" (NO at S209), the server 2 updates the map data (S214). The map version at this time is Ver. 3. Next, the server 2 discards the saved map data (S215) and subsequently sets the change management information="invalid" (S216).

Subsequently, because the map data is updated each time a road change occurs, the car navigation device 1 retrieves the guidance route based on the updated data received from the server 2.

Figure 8:
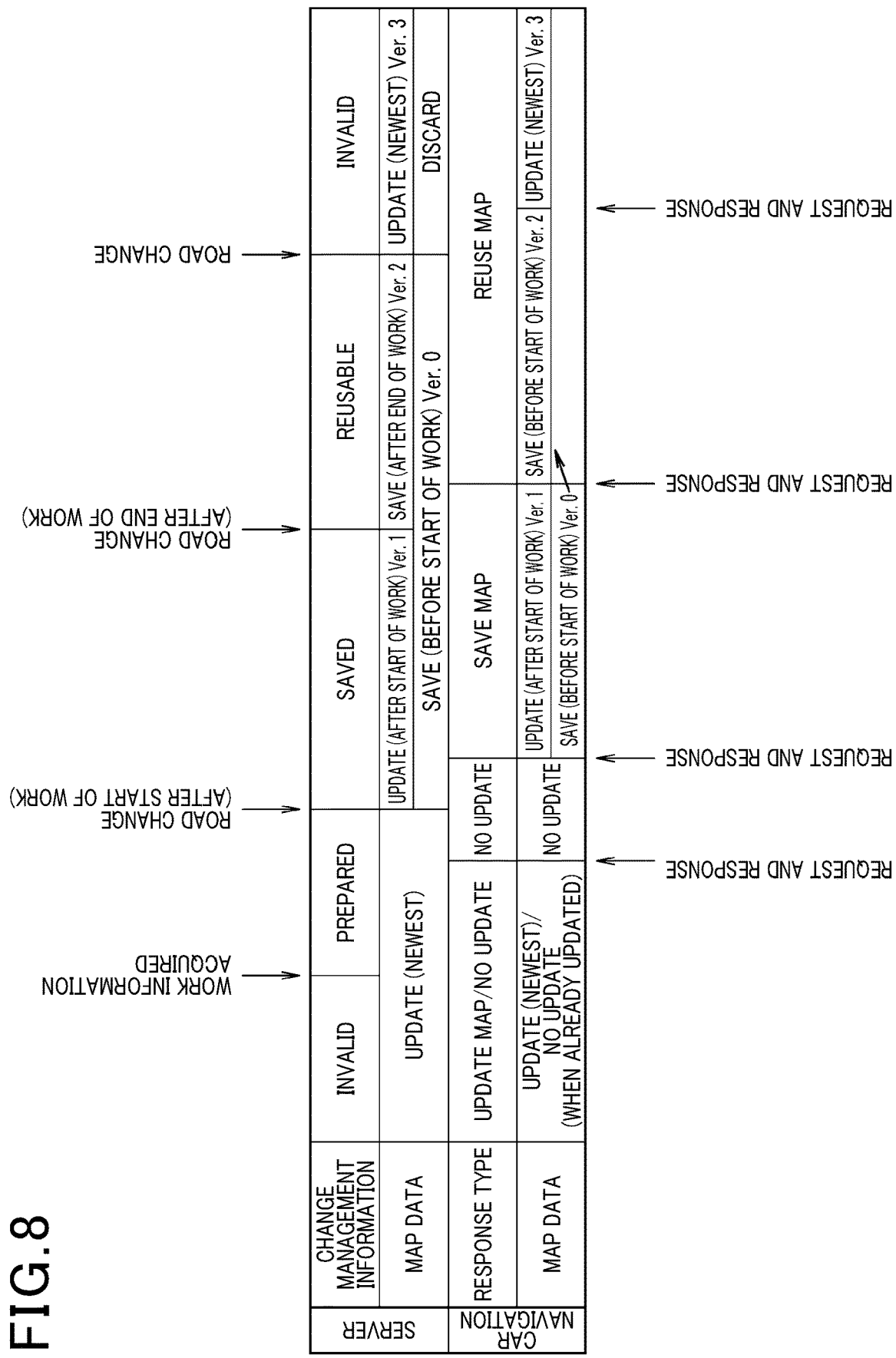
FIG. 8 is a diagram showing operations of the car navigation device and the server in association.

When the operations of the car navigation device 1 and the server 2 described above are summarized, the operations can be expressed as shown in FIG. 8. Here, FIG. 8 shows a case in which the updated data after the end of work matches the saved map data, that is, when the saved information=ON.

3. Operations for the Car Navigation Device 1 when a Change in Road State is Required to be Reflected after a Work Period (the Map Data in the Car Navigation Device 1 is not Updated During the Work Period)

When the vehicle does not reach the work section during the work period, but rather, reaches the work section for the first time after the end of work, the car navigation device 1 receives the response type="reuse map" from the server 2 without saving the map data (NO at S409). Therefore, the above-described saved map data is not present.

Here, when the response type="reuse map" (NO at S409), when the saved information=OFF (NO at S413), the car navigation device 1 updates the map version of own map data without restoring the saved map data (S415). The map version at this time is Ver. 2. In this case, because the map data remains the map data from before the start of work and is the same as the update data after the end of work, the car navigation device 1 can retrieve the guidance route by continuously using the map data from before the start of work.

According to an embodiment such as this, the following effects can be obtained.

The server 2 determines the change management information (status) when a road change occurs, and responds with a confirmation result based on the change management information when a confirmation request regarding the updated data is received from the car navigation device 1. The car navigation device 1 performs the map data update process based on the confirmation result from the server 2. Therefore, when the map data is determined to be the same as that before road work as a result of temporary road work being ended, the saved map data that is saved before the roadwork can be restored and used. As a result, data communication between the car navigation device 1 and the server 2 after the end of work can be suppressed. Consequently, the amount of data communication between the car navigation device 1 and the server 2 can be reduced.

When the response type="reuse map" and the saved information=OFF, that is, when the vehicle does not pass through the work section during the work period, but rather, passes through for the first time after the end of work, the car navigation device 1 can use the own map data from before the start of work as the newest map data instead of restoring the saved map data. Consequently, in a manner similar to when the saved map data is used as described above, the amount of data communication between the car navigation device 1 and the server 2 can be reduced.

The server 1 can appropriately determine the work section and the work period, and efficiently perform processing by acquiring information on the work section and the work period in detail as work information from outside.

In the updating of map data, for freshness/update management of the map data, management is performed by a map version being assigned in units of updates, based on date of update, or the like. However, when a reuse instruction regarding the saved map data on the car navigation device 1 side or an instruction to use existing map data as is received from the server 2, only management information is updated to the newest information, and the map data on the car navigation device 1 side remains old. Therefore, consistency with other management information can be maintained.

Other Embodiments

The update method for the map data may be update using communication through Wi-Fi or a medium such as the USB, in addition to communication by DCM.

Attributes when the matching of map data is determined may not only be shape, such as road topography, but also be road attributes such as a number of traffic lanes and regulations, as well as ground objects such as a sign that is set on a roadside.

As a means for acquiring temporary road work information, in addition to official bulletins, prefectural bulletins, and information in print and online that is provided by road administrators/construction managers, image recognition of construction signs and the like using camera images from the vehicle, and infrastructure information such as Vehicle Information and Communication System (VICS, registered trademark) and Dedicated Short Range Communications (DSRC) may also be used.

The onboard terminal is not limited to the car navigation device. A smart phone, a tablet, or a personal computer may be used.

The updating of map data for automatic driving is also applicable.

The present disclosure is described based on the embodiments. However, it is understood that the present disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A map update method comprising:
transmitting, by an onboard terminal, a confirmation request as to whether updated data that is map data for updating is available;
in response to the confirmation request being received from the onboard terminal, transmitting, by a map update server, a confirmation result to enable the onboard terminal to update map data in the onboard terminal;
in response to the confirmation request being received from the onboard terminal in a state in which the updated data after start of a temporary road change is available, distributing, by the map update server, the updated data and transmitting, by the map update server, the confirmation result to instruct the onboard terminal to temporarily use the updated data;
in response to the confirmation request being received from the onboard terminal in a state in which the updated data after end of a temporary road change is available, transmitting, by the map update server, the confirmation result to instruct the onboard terminal to use the updated data from before the start of the temporary road change;
in response to the confirmation result from the map update server to instruct the onboard terminal to temporarily use the updated data, using, by the onboard terminal, the updated data that has already been distributed;
in response to the confirmation result from the map update server to instruct the onboard terminal to use the updated data from before the start of the temporary road change, using, by the onboard terminal, map data from before the start of the temporary road change instead of the updated data;
acquiring, by the map update server, work information;
setting, by the map update server, a state in which the map update server acquires the work information to be a state in which the temporary road change is started;
setting a status of management information to an invalid state, by the map update server, in response to the management information being in an initial state;
setting the status of management information to a prepared state, by the map update server, in response to the work information being acquired when the status of management information indicates the invalid state;
in response to a road change occurring when the status of management information indicates the prepared state, updating the map data to the updated data and setting the status of management information to a saved state, by the map update server;
in response to a road change occurring in the saved state, updating the map data to the updated data, by the map update server,
when the updated data matches the map data from before the temporary road change, setting the status of management information to a reusable state, by the map update server, and
when the updated data does not match the map data from before the temporary road change, discarding the map data that is saved and setting the status of management information to the invalid state, by the map update server;
in response to a road change occurring when the status of management information indicates the reusable state, updating the map data to the updated data, discarding the saved map data, and setting the status of management information to the invalid state, by the map update server;
when a newest map is requested by the onboard terminal,
distributing the updated data to which a map version is added and instructing the onboard terminal to update the map data, by the map update server, when the status of management information indicates the invalid state,
instructing the onboard terminal not to update the map data, by the map update server, when the status of management information indicates the prepared state,
distributing the updated data to which a map version is added and instructing the onboard terminal to save the map data, by the map update server, when the status of management information indicates the saved state, and
instructing the onboard terminal to reuse the map data and distributing the map version, by the map update server, when the status of management information indicates the reusable state; and when the updated data is requested to the map update server, performing no operation, by the onboard terminal, in response to being instructed not to update the map data, updating the map data to the updated data distributed by the map update server, by the onboard terminal, in response to being instructed to update the map data, saving the map data and updating to the updated data, by the onboard terminal, in response to being instructed to save the map data, and restoring the saved map data and updating an own map version, by the onboard terminal, in response to being instructed to reuse the map data.

2. The map update method according to claim 1, further comprising:

instructing, by the map update server, the onboard terminal to save the map data when instructing the onboard terminal to temporarily use the updated data;

instructing, by the map update server, the onboard terminal to reuse the saved map data when instructing the onboard terminal to use the updated data from before the start of the temporary road change;

saving, by the onboard terminal, the map data from before the temporary road change in response to the map update server instructing the onboard terminal to save the map data; and restoring, by the onboard terminal, the saved map data in response to the map update server instructing the onboard terminal to reuse the map data.

3. The map update method according to claim 2, further comprising:

continuing, by the onboard terminal, to use the map data from before the temporary road change in response to the map update server instructing the onboard terminal to reuse the map data without instructing the onboard terminal to save the map data.

4. A map update server that transmits a confirmation result in response to a confirmation request, from an onboard terminal, as to whether updated data that is map data for updating is available, and enables the onboard terminal to update map data in the onboard terminal, the onboard terminal including an onboard-terminal-side update managing unit that, in response to the confirmation result from the map update server to instruct the onboard terminal to temporarily use the updated data, uses the updated data that has already been distributed, and in response to the confirmation result from the map update server to instruct the onboard terminal to use the updated data from before start of a temporary road change, uses map data from before the start of the temporary road change instead of the updated data, the map update server comprises:

a server-side update managing unit that, in response to the confirmation request being received from the onboard terminal in a state in which the updated data after the start of a temporary road change is available, transmits the confirmation result to distribute the updated data and instruct the onboard terminal to temporarily use the updated data, and in response to the confirmation request being received from the onboard terminal in a state in which the updated data after end of a temporary road change is available, transmits the confirmation result to instruct the onboard terminal to use the updated data from before the start of the temporary road change, wherein:

the map update server includes an acquiring unit that acquires work information;

the server-side update managing unit sets a state in which the acquiring unit acquires the work information to be a state in which the temporary road change is started;

the server-side update managing unit sets a status of management information to an invalid state when the management information is in an initial state, sets the status of management information to a prepared state in response to the work information being acquired when the management information indicates the invalid state, in response to a road change occurring when the status of management information indicates the prepared state, updates the map data to the updated data and sets the status of management information to a saved state, in response to a road change occurring when the status of management information indicates the saved state, updates the map data to the updated data, when the updated data matches the map data from before the temporary road change, sets the status of management information to a reusable state, and when the updated data does not match the map data from before the temporary road change, discards the map data that is saved and sets the status of management information to the invalid state, and in response to a road change occurring when the status of management information indicates the reusable state, updates the map data to the updated data, discards the saved map data, and sets the status of management information to the invalid state, and when a newest map is requested by the onboard terminal, distributes the updated data to which a map version is added and instructs the onboard terminal to update the map data when the status of management information indicates the invalid state, instructs the onboard terminal not to update the map data when the status of management information indicates the prepared state, distributes the updated data to which a map version is added and instructs the onboard terminal to save the map data when the status of management information indicates the saved state, and instructs the onboard terminal to reuse the map data and distributes the map version when the status of management information indicates the reusable state; and when the updated data is requested to the map update server, the onboard-terminal-side update managing unit performs no operation in response to being instructed not to update the map data, updates the map data to the updated data distributed by the map update server in response to being instructed to update the map data, saves the map data and updates the map data to the updated data in response to being instructed to save the map data, and restores the saved map data and updates an own map version in response to being instructed to reuse the map data.

5. The map update server according to claim 4, wherein the server-side update managing unit instructs the onboard terminal to save the map data when instructing the onboard terminal to temporarily use the updated data, and instructs the onboard terminal to reuse the saved map data when instructing the onboard terminal to use the updated data from before the start of the temporary road change; and the onboard-terminal-side update managing unit saves the map data from before the temporary road change in response to the map update server instructing the onboard terminal to save the map data, and restores the saved map data in response to the map update server instructing the onboard terminal to reuse the map data.

6. The map update server according to claim 5, wherein the onboard-terminal-side update managing unit continues to use the map data from before the temporary road change in response to the map update server instructing the onboard terminal to reuse the map data without instructing the onboard terminal to save the map data.

7. An onboard terminal that transmits, to a map update server, a confirmation request as to whether updated data that is map data for updating is available and enables own map data to be updated in response to a confirmation result from the map update server, the map update server including a server-side update managing unit that, in response to the confirmation request being received from the onboard terminal in a state in which the updated data after start of a temporary road change is available, transmits the confirmation result to distribute the updated data and instruct the onboard terminal to temporarily use the updated data and, and in response to the confirmation request being received from the onboard terminal in a state in which the updated data after end of a temporary road change is available, transmits the confirmation result to instruct the onboard terminal to use the updated data from before the start of the temporary road change, the onboard terminal comprising:

an onboard-terminal-side update managing unit that, in response to the confirmation result from the map update server to instruct the onboard terminal to temporarily use the updated data, uses the updated data that has already been distributed, and in response to the confirmation result from the map update server to instruct the onboard terminal to use the updated data from before the start of a temporary road change, uses map data from before the start of the temporary road change instead of the updated data, wherein:

the map update server includes an acquiring unit that acquires work information;

the server-side update managing unit sets a state in which the acquiring unit acquires the work information to be a state in which the temporary road change is started;

the server-side update managing unit sets a status of management information to an invalid state when the management information is in an initial state, sets the status of management information to a prepared state in response to the work information being acquired when the management information indicates the invalid state, in response to a road change occurring when the status of management information indicates the prepared state, updates the map data to the updated data and sets the status of management information to a saved state, in response to a road change occurring when the status of management information indicates the saved state, updates the map data to the updated data, when the updated data matches the map data from before the temporary road change, sets the status of management information to a reusable state, and when the updated data does not match the map data from before the temporary road change, discards the map data that is saved and sets the status of management information to the invalid state, and in response to a road change occurring when the status of management information indicates the reusable state, updates the map data to the updated data, discards the saved map data, and sets the status of management information to the invalid state, and when a newest map is requested by the onboard terminal, distributes the updated data to which a map version is added and instructs the onboard terminal to update the map data when the status of management information indicates the invalid state, instructs the onboard terminal not to update the map data when the status of management information indicates the prepared state, distributes the updated data to which a map version is added and instructs the onboard terminal to save the map data when the status of management information indicates the saved state, and instructs the onboard terminal to reuse the map data and distributes the map version when the status of management information indicates the reusable state; and when the updated data is requested to the map update server, the onboard-terminal-side update managing unit performs no operation in response to being instructed not to update the map data, updates the map data to the updated data distributed by the map update server in response to being instructed to update the map data, saves the map data and updates the map data to the updated data in response to being instructed to save the map data, and restores the saved map data and updates an own map version in response to being instructed to reuse the map data.

8. The onboard terminal according to claim 7, wherein the server-side update managing unit instructs the onboard terminal to save the map data when instructing the onboard terminal to temporarily use the updated data, and instructs the onboard terminal to reuse the saved map data when instructing the onboard terminal to use the updated data from before the start of the temporary road change; and the onboard-terminal-side update managing unit saves the map data from before the temporary road change in response to the map update server instructing the onboard terminal to save the map data, and restores the saved map data in response to the map update server instructing the onboard terminal to reuse the map data.

9. The onboard terminal according to claim 8, wherein the onboard-terminal-side update managing unit continues to use the map data from before the temporary road change in response to the map update server instructing the onboard terminal to reuse the map data without instructing the onboard terminal to save the map data.

* * * * *